United States Patent
Caplen et al.

(10) Patent No.: US 6,650,814 B2
(45) Date of Patent: Nov. 18, 2003

(54) SINGLE MODE DISPERSION COMPENSATING OPTICAL FIBER

(75) Inventors: Julie E. Caplen, Painted Post, NY (US); Jean-Philippe J. deSandro, Beaconsfield (CA); Keith L. House, Corning, NY (US); Ming-Jun Li, Horseheads, NY (US); Daniel A. Nolan, Corning, NY (US); V. Srikant, Evanston, IL (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/014,781

(22) Filed: Dec. 11, 2001

(65) Prior Publication Data

US 2003/0113083 A1 Jun. 19, 2003

(51) Int. Cl.[7] .................................................. G02B 6/22
(52) U.S. Cl. ........................ 385/127; 385/123; 385/126
(58) Field of Search ................................ 385/123, 126, 385/127

(56) References Cited

U.S. PATENT DOCUMENTS

| | | | |
|---|---|---|---|
| 4,715,679 A | 12/1987 | Bhagavatula | 350/96.33 |
| 5,361,319 A | 11/1994 | Antos et al. | 385/123 |
| 5,448,674 A | 9/1995 | Vengsarkar et al. | 385/123 |
| 5,553,185 A | 9/1996 | Antos et al. | 385/127 |
| 5,555,340 A | 9/1996 | Onishi et al. | 385/127 |
| 5,568,583 A | 10/1996 | Akasaka et al. | 385/123 |
| 5,581,647 A | 12/1996 | Onishi et al. | 385/123 |
| 5,673,354 A | 9/1997 | Akasaka et al. | 385/127 |
| 5,740,297 A | 4/1998 | Onishi et al. | 385/127 |
| 5,995,695 A | 11/1999 | Aikawa et al. | 385/123 |
| 5,999,679 A | 12/1999 | Antos et al. | 385/127 |
| 6,263,138 B1 * | 7/2001 | Sillard et al. | 385/123 |
| 6,445,864 B2 | 9/2002 | Jiang et al. | 385/127 |
| 6,546,178 B2 | 4/2003 | Jiang et al. | 385/127 |
| 2001/0046358 A1 * | 11/2001 | Sasaoka et al. | 385/123 |
| 2002/0001444 A1 * | 1/2002 | Hirano et al. | 385/123 |
| 2002/0122646 A1 * | 9/2002 | Sugizaki et al. | 385/127 |
| 2002/0154877 A1 | 10/2002 | Li et al. | 385/127 |

FOREIGN PATENT DOCUMENTS

| | | | |
|---|---|---|---|
| EP | 1 130 428 | 9/2001 | G02B/6/16 |
| FR | 1 076 250 | 2/2001 | G02B/6/22 |
| JP | 10 319266 | 4/1998 | |
| WO | WO 99/08142 | 2/1999 | G02B/6/22 |
| WO | WO 00/33114 | 11/1999 | G02B/6/16 |
| WO | WO 00/67053 | 11/2000 | G02B/6/16 |
| WO | WO 01/25828 | 4/2001 | G02B/6/00 |
| WO | WO 01/71391 | 9/2001 | |
| WO | WO 03/027737 | 4/2003 | G02B/6/16 |

OTHER PUBLICATIONS

Gruner–Nielsen L. et al., "Large Volume Manufacturing of Dispersion–Compensating Fibers", OFC, Optical Fiber Communication Conference Technical Digest Series, Washington, DC, May 1998, pp. 24–25.

U.S. patent application Ser. No. 10/013,297, Hebgen et al., filed Nov. 5, 2001.

* cited by examiner

*Primary Examiner*—Hemang Sanghavi
*Assistant Examiner*—Scott Knauss
(74) *Attorney, Agent, or Firm*—Randall S. Wayland (57) ABSTRACT

A single mode dispersion and dispersion slope compensating optical fiber includes a central core segment, a depressed moat segment, an annular ring segment, and a cladding layer. Each of the segments of the fiber have a relative refractive index that are selected to provide negative dispersion at a wavelength of within the range of about 1530 nm to about 1620 nm, negative dispersion slope at a wavelength of within the range of about 1530 nm to about 1620 nm, a kappa value of within the range of 40 to about 60 at a wavelength of about 1550 nm, and a fiber cut-off wavelength of less than about 1650 nm, and more preferably less than 1550 nm.

36 Claims, 4 Drawing Sheets

FIG. 7

SINGLE MODE DISPERSION COMPENSATING OPTICAL FIBER

BACKGROUND OF THE INVENTION

1. Field of the Invention

The present invention relates to dispersion compensating (DC) optical fibers, and more particularly to single mode DC fibers that are particularly well suited for compensating for dispersion in transmission fibers having kappa values of less than 100.

2. Technical Background

To meet the ongoing drive for more bandwidth at lower costs, telecommunications system designers are turning to high channel count dense wavelength division multiplexing architectures, longer reach systems and higher transmission bit rates. This evolution makes chromatic dispersion management critical to systems performance as system designers now desire the ability to accurately compensate dispersion across entire channel plans. More specifically, the increased demand for higher bit transmission rates has resulted in a large demand for optical transmission systems that can control dispersion effects. An analysis of common optical transmission systems indicates that while such systems can tolerate about 1,000 ps/nm residual dispersion at 10 Gbit/second, these systems tolerate only about 62 ps/nm residual dispersion at a higher transmission rate of 40 Gbit/second. Therefore, it is important to accurately control the dispersion for such high bit rate transmissions. This control becomes increasingly important as the transmission rate increases. Further, the need to accurately control dispersion means that dispersion slope of a transmission fiber must also be compensated for, particularly as transmission rates approach 40 Gbit/second.

Various solutions have been proposed to achieve the low dispersion and dispersion slope values required for compensating non-zero dispersion shifted fibers (NZDSFs), including: photonic crystal fibers, higher order mode dispersion compensation fibers, dispersion compensating gratings and dual fiber dispersion compensating techniques. Each of these solutions have drawbacks associated therewith.

Photonic crystal fibers are designed to have a large negative dispersion and a negative dispersion slope that are close to those required for compensating NZDSFs. However, photonic crystal fibers have drawbacks including a relatively small affective area of about 10 $\mu m^2$ or less that leads to unacceptably high splice losses and hence requires the use of a specially designed transition or bridge fiber to reduce splice losses. In addition, due to the very nature of photonic crystal fibers, i.e., glass/air interfaces in the core of the fiber, the related attenuation is unacceptable in the transmission window of interest. Further, photonic crystal fibers are significantly difficult to manufacture on a large scale and are, therefore, expensive.

Higher order mode (HOM) dispersion compensation relies on the dispersion properties of a HOM fiber propagating higher order modes. It has been demonstrated that higher order modes, e.g. $LP_{02}$ and $LP_{11}$, have higher negative dispersions and dispersions slopes than fundamental modes. HOM dispersion compensation typically relies on the conversion of a transmitted fundamental mode to one of the higher order modes via a mode converter. Subsequently, this higher order mode is propagated in the HOM fiber that supports that mode. After a finite distance, the higher order mode is converted back to the fundamental mode via a second mode converting device. Problems associated with HOM dispersion compensation solutions include inefficient mode converters and difficulty of producing HOM fibers that allow higher order mode transmission while resisting coupling to the fundamental mode.

Dispersion compensating gratings are utilized to achieve a required differential group delay via chirped gratings. Techniques utilizing dispersions compensating gratings have been shown to be useful only for narrow bands, as these techniques typically suffer from dispersion and dispersion slope ripple when the required grating length becomes large.

In dual fiber dispersion compensating fiber solutions for NZDSFs, the dispersion and slope compensation are partially de-coupled and separately treated in each fiber. Typically, dual fiber dispersion compensating techniques include the use of a dispersion compensating fiber followed by a dispersion slope compensating fiber. Such solutions require the use of a dispersion slope compensating fiber that compensates for a relative small dispersion slope. Further, such solutions are subject to additional splice losses and are a comparatively complex solution.

Extensive profile modeling of optical fibers has resulted in well-established correlations between dispersion slope, effective area and bend sensitivity. By increasing the role played by wavelength dispersion in a given fiber, it is possible to decrease the slope and even create a negative slope in some cases. However, as the affective area is decreased, the bend sensitivity of the fiber is increased. The effective area of the fiber can be further increased, but generally at the expense of further degradation of the bend sensitivity. Decreasing the dispersion slope, or making the dispersions slope negative, results in working close to the cut-off wavelength of the fundamental mode, which in turn makes the fiber more bend sensitive and results in greater signal loss at wavelengths greater than 1560 nm. As a result of these relationships, it is extremely difficult to manufacture a viable DC fiber that compensates both dispersion and dispersion slope effectively. Moreover, when kappa (dispersion/dispersion slope) is low, it is difficult to adequately compensate for dispersion over wide wavelength bands.

Heretofore, the most viable broad band commercial technology available to reduce or eliminate dispersion has been DC fiber modules. As dense wavelength division multiplexing deployments increase to 16, 32, 40 and more channels, broad band DC products are desired. Further, as interest increases in higher bit-rate information transmission, i.e., greater than 40 Gbit/second, ultra-long reach systems, i.e., systems greater than 100 km in length, and optical networking, it has been imperative to use DC fibers even on networks that carry data on NZDSFs. One such NZDSF is LEAF® optical fiber, manufactured by and available from Corning Incorporated of Corning, N.Y. LEAF® fiber is a positive NZDSF that has been the optical fiber of choice for many new systems due to its inherently low dispersion and economic advantage over conventional signal mode fibers.

The combination of the early versions of DC fibers with NZDSFs effectively compensated dispersion at only one wavelength with significant residual system dispersion being present within the operating band at wavelengths away from that one wavelength. However, higher bit-rates, longer reaches and wider bandwidths require dispersion slope to be compensated for more exactly. Consequently, it is desirable for the DC fiber to have dispersion characteristics such that its dispersion and dispersion slope are matched to that of the transmission fiber it is required to compensate.

Therefore, it would be desirable to develop alternative DC fibers, particularly fibers having the ability to compensate for dispersion and dispersion slope of NZDSFs and other positive dispersion optical fibers over a wide wavelength band of around 1550 nm.

SUMMARY OF THE INVENTION

The present invention meets the need for a DC fiber that compensates for dispersion and dispersion slope of a NZDSF. The DC fiber disclosed herein enables accurate and substantially complete compensating for dispersion and dispersion slope for a NZDSF wherein such DC fiber exhibits both negative total dispersion and negative dispersion slope at 1550 nm.

One embodiment of the present invention is a dispersion and dispersion slope compensating optical fiber that includes a central core segment having a relative refractive index, a depressed moat segment on the periphery of the central core segment and having a relative refractive index that is less than the relative refractive index of the central core segment, an annular ring segment on the periphery of the depressed moat segment and having relative refractive index that is less than the relative refractive index of the central core segment and greater than the relative refractive index of the depressed moat segment, and a cladding layer on the periphery of the depressed moat segment and having a relative refractive index that is less than the relative refractive index of the annular ring segment and greater than the relative refractive index of the depressed moat segment. The relative refractive indices of the segments are selected to provide negative dispersion at a wavelength of within the range of from about 1530 nm to about 1620 nm, negative dispersion slope at a wavelength of within the range of from about 1530 nm to about 1620 nm, a kappa value of within the range of from about 40 to about 60 at a wavelength of about 1550 nm, and a fiber cut-off wavelength of less than about 1650 nm.

Another embodiment of the present invention relates to a dispersion and dispersion slope compensating optical fiber that includes a central segment having a relative refractive index, a first annular segment surrounding the central segment and having a relative refractive index that is less that the relative refractive index of the central segment, a second annular segment surrounding the first annular segment and having a relative refractive index that is less than the relative refractive index of the central segment and greater than the relative refractive index of the first annular segment, and a cladding layer surrounding the second annular segment and having a relative refractive index that is less than the relative refractive index of the second annular segment and greater than the relative refractive index of the first annular segment. The relative refractive indices are selected to provide negative dispersion at a wavelength of within the range of from about 1530 nm to about 1620 nm, negative dispersion slope at a wavelength of within the range of from about 1530 nm to about 1620 nm, a kappa value of less than or equal to about 100 at a wavelength of about 1550 nm, and a fiber cut-off wavelength of less than about 1550 nm.

The present invention also includes optical communication systems employing dispersion and dispersion slope compensating fibers in accordance with the embodiments described above.

The present invention utilizes single waveguide optical fibers to accurately and completely compensate for both dispersion and dispersion slope, thereby eliminating the need for high cost compensating materials and components and/or the required use of compensating fibers that are difficult and expensive to manufacture and which contribute to significant signal loss.

Additional features and advantages of the present invention will be set forth in the detailed description which follows and will be apparent to those skilled in the art from the description or recognized by practicing the invention as described in the description which follows, together with the claims and appended drawings.

It is to be understood that the foregoing description is exemplary of the invention only and is intended to provide an overview for understanding the nature and character of the invention as it is defined in the claims. The accompanying drawings are included to provide a further understanding of the invention and are incorporated and constitute part of this specification. The drawings illustrate various features and embodiments of the invention, which, together with their description serve to explain the principals and operation of the invention.

DETAILED DESCRIPTION OF THE PREFERRED EMBODIMENTS

For purposes of the description herein, it is to be understood that the invention may assume various alternative orientations and step sequences, except where expressly specified to the contrary. It is also to be understood that the specified devices and processes illustrated in the attached drawings, and described in the following specifications are exemplary embodiments of the inventive concepts defined in the appended claims. Hence, specific dimensions and other physical characteristics relating to the embodiments disclosed herein are not to be considered as limiting unless the claims expressly state otherwise.

Definitions

The following definitions and terminology are commonly used in the art.

The radii of the segments of the core are defined in terms of the index of refraction of the material of which the segment is made. A particular segment has a first and a last refractive index point. A central segment has an inner radius of zero because the first point of the segment is on the center line. The outer radius of the central segment is the radius drawn from the waveguide center line to the last point of the refractive index of the central segment. For a segment having a first point away from the center line, the radius from the waveguide center line to the location of its first refractive index point is the inner radius of that segment. Likewise, the radius from the waveguide center line to the location of the last refractive index point of the segment is the outer radius of that segment. The radii of the segments may be conveniently defined in a number of ways. In this application, radii are defined in accordance with the figures, described below.

The relative index of a segment, $\Delta\%$, as used herein, is defined by the equation, $$\Delta\% = 100 \times \frac{n_i^2 - n_c^2}{2n_c^2},$$

where $n_i$ is the maximum refractive index of the index profile segment denoted as i, and $n_c$, the reference refractive index, is taken to be the minimum index of the clad layer. Every point in the segment has an associated relative index. The maximum relative index is used to conveniently characterize a segment whose general shape is known.

The term refractive index profile or index profile is the relation between $\Delta\%$ or refractive index and radius over a selected segment of the core.

The bend loss of a waveguide fiber is expressed as induced attenuation under prescribed test conditions. The bend test referenced herein is used to compare relative resistance of waveguide fiber to bending. To perform the test, a DC fiber according to the invention with a length of longer than 1 km is wound about a mandrel of 6 inches in diameter without any tension. Then the attenuation of the DC fiber is measured using a standard Optical Time Domain Reflectometry (OTDR) instrument at the wavelength of 1550 nm.

The effective area is generally defined as, $$A_{eff} = 2\pi (\int E^2 r dr)^2 / (\int E^4 r dr),$$

wherein the integration limits are zero to $\infty$, and E is the electric field associated with the propagated light.

The relationship between a transmission fiber and a dispersion compensating fiber that completely compensates for the dispersion of the transmission fiber follows the general equation of:

$$D_{DC}(\lambda)L_{DC} = -D_T(\lambda)L_T,$$

wherein $D_{DC}(\lambda)$ is the dispersion of the dispersion compensating fiber, $L_{DC}$ is the length of the dispersion compensating fiber, $D_T(\lambda)$ is the dispersion of the transmission fiber, $\lambda$ is a wavelength in the optical transmission band, and $L_T$ is the length of the transmission fiber. The desired relationship of the $\kappa$ of the optical fibers in transmission line is as follows:

$$\kappa_{DC}(\lambda) = \frac{D_{DC}}{S_{DC}} = \kappa_T(\lambda) = \frac{D_T}{S_T},$$

wherein $\kappa_{DC}(\lambda)$ is the $\kappa$ value for the dispersion compensating fiber at a particular wavelength, $D_{DC}$ is the dispersion for the dispersion compensating fiber, $S_{DC}$ is the dispersion slope for the dispersion compensating fiber, $\kappa_T(\lambda)$ is the $\kappa$ value for the transmission fiber at the same wavelength, $D_T$ is the dispersion for the transmission fiber, and $S_T$ is the dispersion slope for the transmission fiber.

The dispersion and dispersion slope compensating optical fiber described and disclosed herein has a generally segmented core. Each of the segments is described by a refractive index profile, relative refractive index percent, $\Delta_i\%$, and an outside radius, $r_i$. The subscript of i on $\Delta$ and r refers to a particular segment. The segments are numbered 1-n beginning with the inner most segment which includes the waveguide long axis centerline. The clad layer having a refractive index, $n_c$, surrounds the core.

The radius, relative refractive index percent, and refractive index profile of each segment of the DC fiber are selected to provide: negative dispersion at a wavelength of within the range of from about 1530 nm to about 1620 nm; negative dispersion slope at a wavelength of within the range of from about 1530 nm to about 1620 nm; a kappa value of within the range of from about 40 to about 60 at a wavelength of about 1550 nm; and, a fiber cut-off wavelength of less than about 1650 nm.

Figure 1:
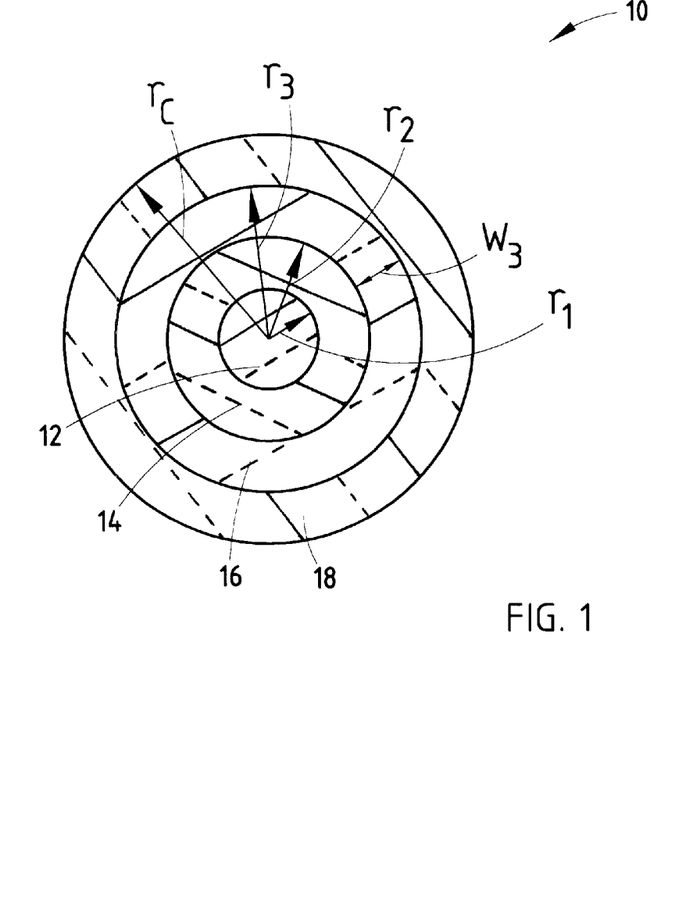
FIG. 1 is a schematic cross-sectional view of a novel optical waveguide embodying the present invention.

The DC fiber according to the invention described and disclosed herein has a generally segmented structure, as shown in FIG. 1. Each of the segments is described by a refractive index profile, relative refractive index percent, $\Delta_i$, and an outside radius, $r_i$. The subscript i for the r and $\Delta$ refers to a particular segment. The segments are numbered $r_1$ through $r_c$ beginning with the innermost segment which includes the waveguide longitudinal axis center line. A clad layer having a refractive index of $n_c$ surrounds the optical waveguide fiber. In the illustrated example, the optical waveguide compensating fiber 10 includes a central core segment 12 having an outer radius $r_1$, a depressed moat segment 14 having an outer radius $r_2$, an annular ring segment 16 having an outer radius $r_3$, and a width $w_3$, and a cladding layer 18 having an outer radius $r_c$.

Figure 2:
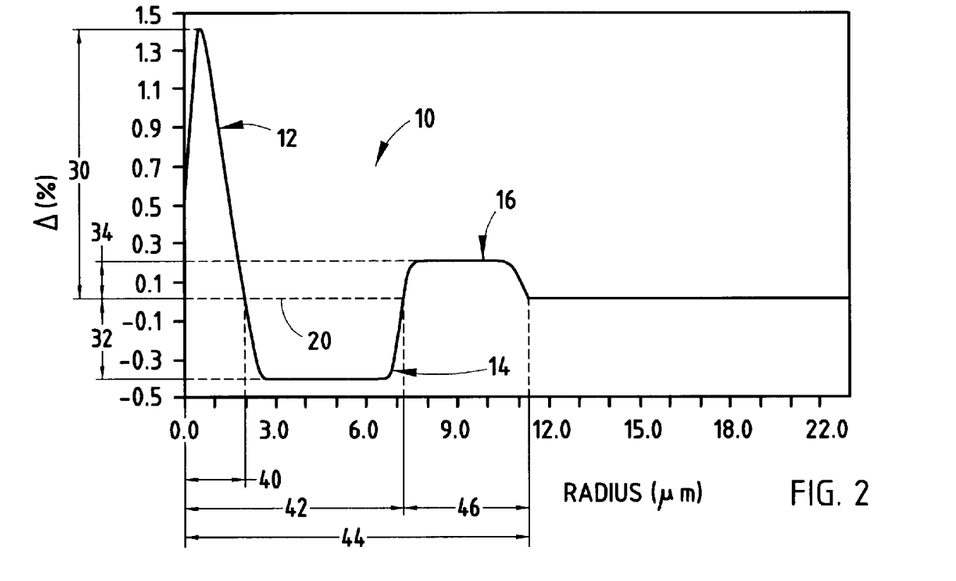
FIG. 2 is a diagram of a waveguide refractive index profile of the present inventive dispersion compensating fiber.

A general representation of the relative refractive index profile of compensation fiber 10 is illustrated in FIG. 2, which shows relative refractive index percent charted versus the compensation fiber radius. Although FIG. 2 shows only three discreet segments, it is understood that the functional requirements may be met by forming an optical waveguide compensation fiber having more than three segments. However, embodiments having fewer segments are usually easier to manufacture and are therefore preferred. Further, the fiber 10 may be constructed via a variety of methods including, but in no way limited to, vapor axial deposition (VAD), modified chemical vapor deposition (MCVD) and outside vapor deposition (OVD).

Preferably, segments 12 and 16 are formed using germanium doped $SiO_2$, although other forms of index of refraction increasing dopant may also be employed to achieve the fibers disclosed herein, so long as the same general refractive index profile is achieved. Likewise, segment 14 is preferable formed using fluorine doped $SiO_2$, however, other index of refraction decreasing dopants may be employed besides fluorine. Cladding layer 18 is preferable formed of pure silica, however, may also include index of refraction increasing or decreasing dopants, so long as the relationship between $\Delta_1$, $\Delta_2$, $\Delta_3$ and $\Delta_c$ within the refractive index profile illustrated in FIG. 2 is maintained. Further, segments within profile 10 displaying a positive relative refractive index may include fluorine as a co-dopant therein, thereby reducing the final water content in the associated fiber segment and decreasing the water content therein.

The core segment 12 has a relative refractive index 30, $\Delta_1$, within the range of from about 1.45% to about 2.35%, more preferably of from about 1.50% to about 1.80%, and most preferably of from about 1.50% to about 1.60%. Core segment 12 further has an outer radius 40, $r_1$, within the range of from about 2.2 $\mu$m to about 2.8 $\mu$m, more preferably within range from about 2.5 μm to about 2.7 μm, and most preferably within the range of from about 2.61 μm to about 2.64 μm. The outer radius 40, $r_1$, of core segment 12 is also the inner radius of moat segment 14. The outer radius 40, $r_1$, of core segment 12, therefore, is the intersection of core segment 12 and moat segment 14. In this case, the intersection point is defined as the intersection of the descending portion of the index profile of core segment 12 with the horizontal axis 20, defined as the axis through an un-doped cladding layer 18 formed of $SiO_2$, i.e., a Δ=0% relative refractive index.

The moat segment 14 has a relative refractive index 32, $\Delta_2$, that is less than or equal to about −0.65%, more preferably within the range of from about −1.20% to about −0.70%, and most preferably within the range of from about −0.80% to about −0.70%. Moat segment 14 has an outer radius 42, $r_2$, within the range of from about 3.5 μm to about 6.0 μm, more preferably within the range of from about 4.8 μm to about 5.9 μm, and most preferably within the range of from about 5.5 μm to about 5.9 μm. The outer radius 42, $r_2$, of moat segment 14 is also the inner radius of ring segment 16. The outer radius, $r_2$, of moat segment 14, therefore, is the intersection of moat segment 14 and ring segment 16. In this case, the intersection point is defined as the intersection of the ascending portion of the index profile of moat segment 14 with the horizontal axis 20 as defined above. In the illustrated example, fiber 10 has a ratio of the outer diameter 42, r, of core segment 12 to the outer diameter 44, $r_2$, of moat segment 14 of within the range of from about 0.30 to about 0.56, more preferably within the range of from about 0.44 to about 0.55 and most preferably within the range of from about 0.44 to about 0.48.

The ring segment 16 has a relative refractive index 34, $\Delta_3$, within the range of from about 0.10% to about 0.30%, more preferably within the range from about 0.18% to about 0.20%, and most preferably within the range from about 0.19% to about 0.20%. Ring segment 16 has a central radius 44, $r_3$, within the range of from about 6.0 μm to about 8.5 μm, more preferably within the range of from about 6.5 μm to about 7.7 μm, and most preferably within the range of from about 7.3 μm to about 7.4 μm. For profiles having more than one annular segment, such as the example illustrated in FIG. 2, the outer most annular segment, such as ring segment 16, is characterized by a width. Ring segment 16 has a width 46 of about 4.0 μm. In the illustrated example, width 46 is defined by the distance between the intersection of the ascending portion of the profile of moat segment 14 with the horizontal axis 20 as defined above, and the intersection of the descending portion of the profile of ring segment 16 with the horizontal axis 20 as defined above. It should be noted that the relative refractive index, $\Delta_3$, and radius, $r_3$, of ring segment 16 can vary more than in core segment 12 and moat segment 14. For example, a higher and narrower ring segment 16 may be replaced by a shorter and wider ring segment 16 to achieve a fiber exhibiting the desired properties in accordance with the invention.

The radii, relative refractive indices and refractive index profile of each segment of the overall profile of fiber 10 are selected to provide the following optical properties at a wavelength of about 1550 nm: a negative total dispersion, more preferably a dispersion of between −140 ps/nm-km to about −240 ps/nm-km, and most preferably within the range of from about −200 ps/nm-km to about −240 ps/nm-km; a negative dispersion slope, and more preferably a dispersion slope of less than or equal to about −2.5 ps/nm², a kappa value of less than or equal to about 100, more preferably less than or equal to about 60, and most preferably within the range of from about 40 to about 60; a fiber cut-off wavelength of less than 1650 nm, more preferably less than 1550 nm, even more preferably within the range of from about 1470 nm to about 1530 nm, even more preferably of less than or equal to about 1500 nm, and most preferably of less than or equal to 1450 nm; and, an effective area of greater than or equal to about 8 μm², more preferably greater than or equal to about 15 μm², and most preferably greater than or equal to about 18 μm².

EXAMPLES

The invention will be further illustrated by the following examples which are meant to be illustrative and exemplary of the invention.

Figure 3:
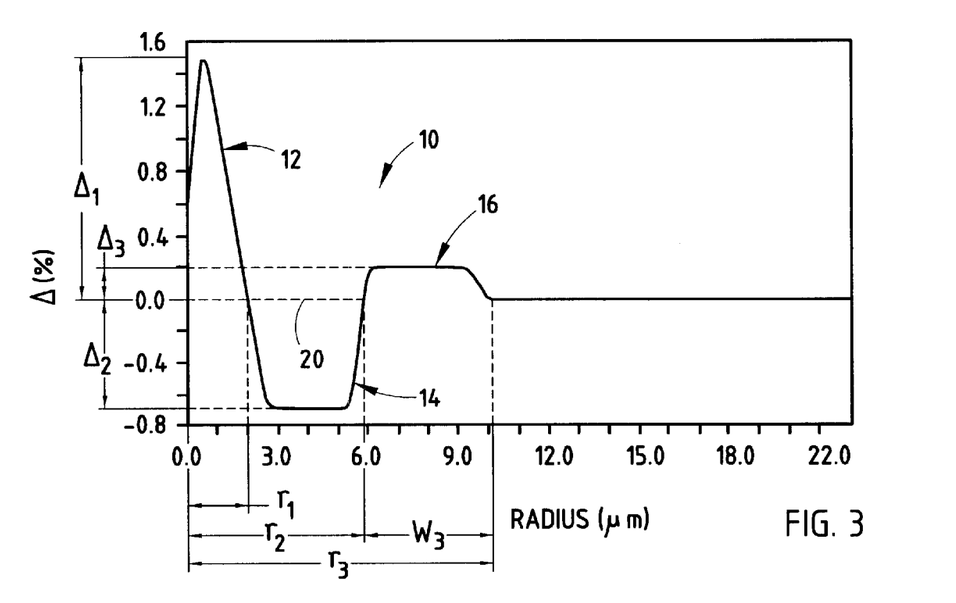
FIG. 3 is a diagram of a waveguide refractive index profile of first embodiment of the dispersion compensating optical fiber.
Figure 4:
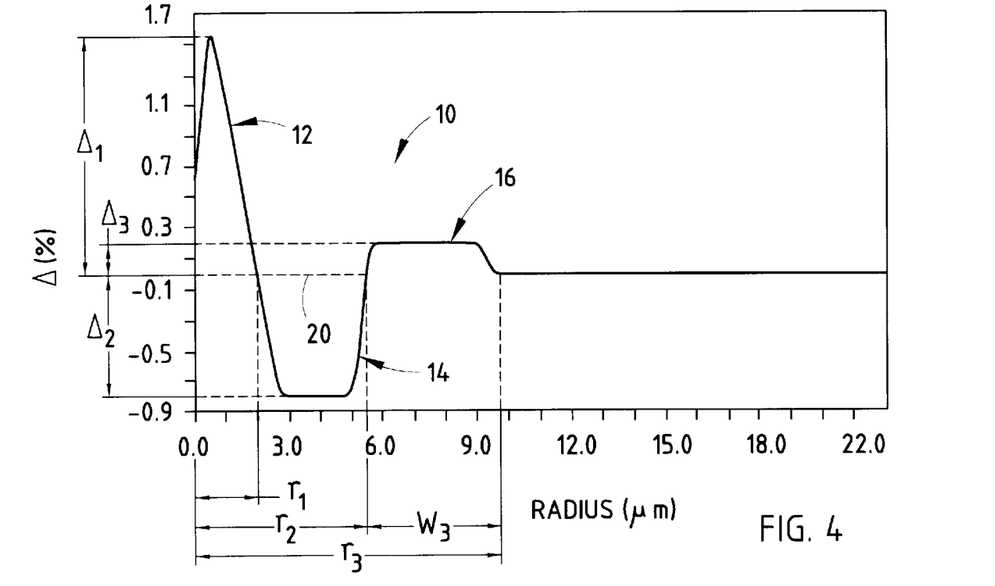
FIG. 4 is a diagram of a waveguide refractive index profile of a second embodiment of the dispersion compensating optical fiber.
Figure 5:
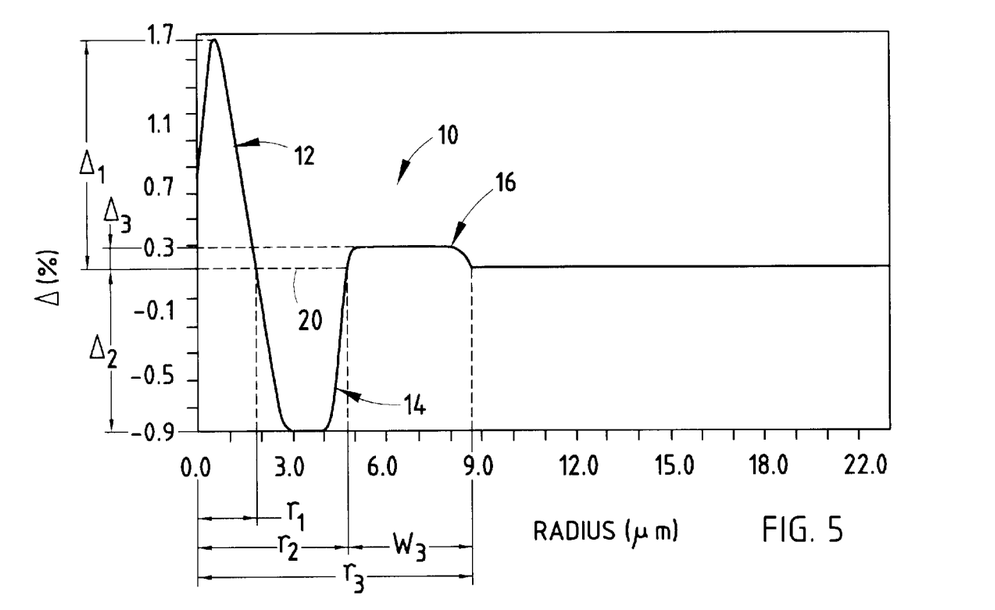
FIG. 5 is a diagram of a waveguide refractive index profile of a third embodiment of the dispersion compensating optical fiber.
Figure 6:
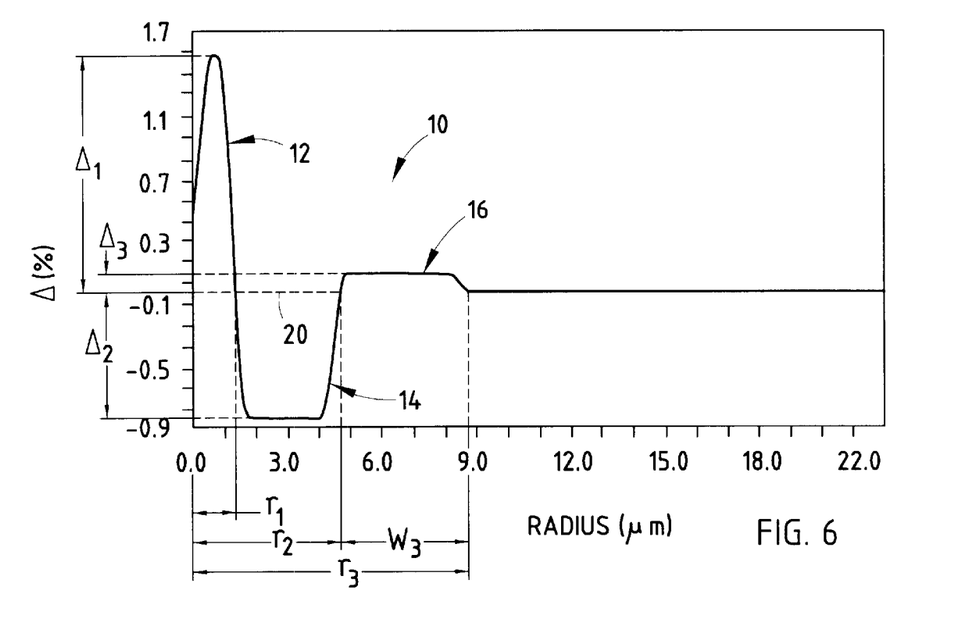
FIG. 6 is a diagram of a waveguide refractive index profile of a fourth embodiment of the dispersion compensating optical fiber.

In example 1, as listed in Table 1, and illustrated in FIG. 3, a fiber having a refractive index profile includes a core region 12 having a peak relative refractive index, $\Delta_1$, of 1.51% and an outer radius, $r_1$, of 2.62 μm, a moat segment 14 having a relative refractive index, $\Delta_2$, of about −0.70% and an outer radius, $r_2$, of about 5.90 μm, and a ring segment 16 having a relative refractive index, 3, of about 0.19% and a width $w_3$ of about 4.0 μm. The raised index segments 12 and 16 were formed using germanium doping while the lowered index segment 14 was formed using fluorine doping. Cladding segment 18 includes undoped silica, and has an outer radius of about 6.25 μm. The fiber of example 1 exhibits a dispersion of —148 ps/nm-km at a wavelength of about 1550 nm, a dispersion slope of 3.02 ps/nm²-km at 1550 nm at a wavelength of about 1550 nm, and a kappa value of about 49 also at a wavelength of about 1550 nm. The fiber of example 1 further exhibits a cut-off wavelength of about 1637 nm, a zero dispersion wavelength of about 1501 nm, and an affective area of about 18.6 μm at a wavelength of about 1550 nm.

Additional examples of dispersion and dispersion slope compensating fibers in accordance with the invention are listed in Table 1, and corresponding FIGS. 3–6.

TABLE 1

|  | Ex. 1 | Ex. 2 | Ex. 3 | Ex. 4 |
|---|---|---|---|---|
| Corresponding Figure | 3 | 4 | 5 | 6 |
| $\Delta_1$ (%) | 1.92 | 2.00 | 2.32 | 2.32 |
| $r_1$ (μm) | 2.62 | 2.63 | 2.63 | 1.29 |
| $\Delta_2$ (%) | −0.70 | −0.80 | −1.20 | −1.20 |
| $r_2$ (μm) | 5.90 | 5.50 | 4.80 | 3.80 |
| $\Delta_3$ (%) | 0.19 | 0.20 | 0.18 | 0.18 |
| $r_3$ (%) | 7.70 | 7.34 | 6.50 | 6.50 |
| Ring width (μm) | 4.00 | 4.00 | 4.00 | 4.00 |
| Dispersion (ps/nm-km) at 1550 nm | −148 | −191 | −194 | −174 |
| Dispersion slope (ps/nm²-km) at 1550 nm | −3.02 | −3.82 | −3.88 | −3.63 |
| kappa at 1550 nm | 49 | 50 | 50 | 48 |
| Fiber cut-off wavelength (nm) | 1637 | 1648 | 1606 | 1618 |
| Zero-dispersion wavelength (nm) | 1501 | 1500 | 1500 | 1502 |
| Effective area (μm²) at 1550 nm | 18.6 | 18.64 | 15.00 | 9.63 |
| Bend loss (dB/km) at 1550 nm | 0.011 | 0.013 | 0.006 | 0.0003 |

Each of the fibers listed in the examples herein were constructed from a preform made using a plasma chemical vapor deposition lathe by depositing first a fluorine doped cladding into a $SiO_2$ substrate tube with a low-pressure plasma of approximately 10 Torr. Deposition was achieved by traversing the microwave head applicator along the tube at a speed of approximately 15 cm/s while the reacting gasses, i.e., $SiCl_4$, $O_2$ and $C_2F_6$, were introduced inside the tube. A $GeO_2$ core was then deposited and the resulted cane was collapsed by a $H_2/O_2$ burner to form a solid cane. A main advantage of the plasma chemical vapor deposition method is depositing consolidated layers of glass with little or no migration of the mobile species, i.e., germanium and fluorine.

Figure 7:
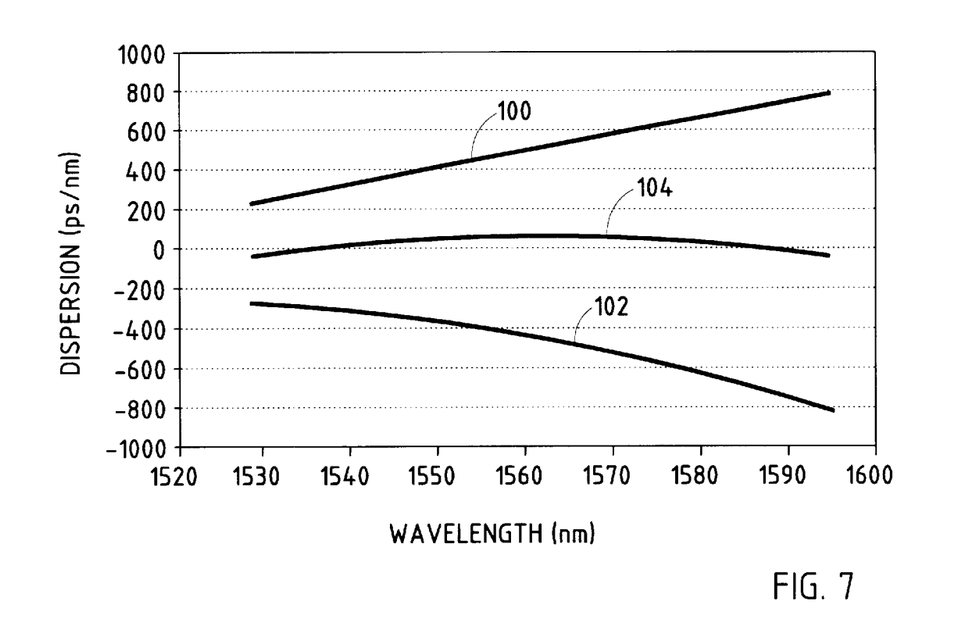
FIG. 7 is a graph diagram of dispersion versus wavelength for LEAF™ fiber, a dispersion compensating fiber and the total dispersion for the combination thereof.

FIG. 7 illustrates the residual dispersion of a 100 km span of LEAF® fiber, manufactured by and available from Corning Incorporated of Corning, N.Y., coupled to approximately 4 km of dispersion compensating fiber representative of the fibers listed in Table 1. Specifically, the graph of dispersion versus wavelength in FIG. 7 includes a graphing of the dispersion of 100 km of LEAF® 100, 4 km of the percent inventive dispersion compensating fiber 102 and the total dispersion for the combination 104, the graph indicates a dispersion within the range of from about 40 ps/nm-km to about 60 ps/nm-km over a wavelength range of from about 1530 nm to about 1600 nm. Further, the graph of FIG. 7 indicates a dispersion compensation over both the C-band and L-band wavelength ranges with a single compensating fiber.

Figure 8:
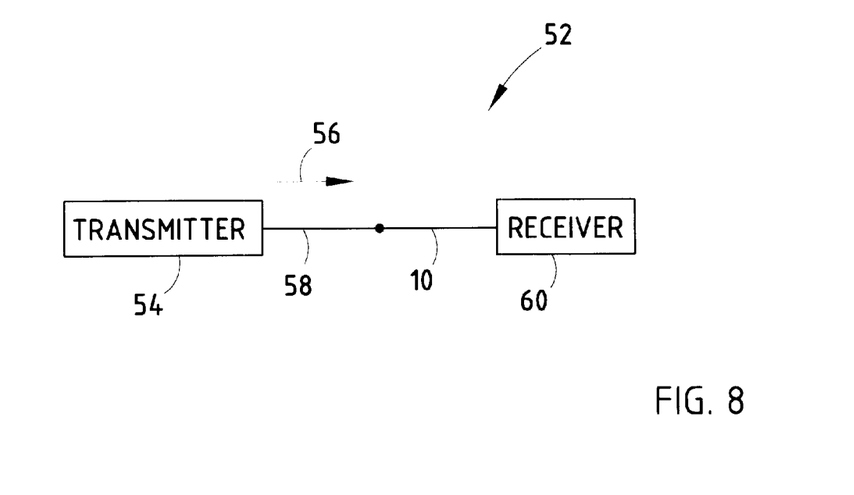
FIG. 8 is a schematic view of a fiber optic communication system employing the optical waveguide fiber of the present invention.

A dispersion and dispersion slope compensating optical waveguide fiber 10 manufactured in accordance with the present invention may be used in an optical fiber communication system 52, as shown in FIG. 8. System 52 includes an optical transmitter 54 adapted to transmit an optical signal in a direction indicated by an arrow 56 through an optical waveguide transmission fiber or compensated fiber 58 which is in optical communication with transmitter 54. System 52 also includes the dispersion and dispersion slope compensating fiber 10 in optical communication with transmission fiber 58 and an optical receiver 60 adapted to receive the optical signal 56. Fiber 10 may be employed within system 52 in a coil form, within a box, or in any other form or packaging as known in the art. In most systems, both ends of transmission fiber 58 and compensating fiber 10 will be capable of two-way signal transmission, and transmitter 54 and receiver 60 are shown for illustration only.

It will be become apparent to those skilled in the art that various modifications to the preferred embodiment of the invention as described herein can be made without departing from the spirit or scope of the invention as defined by the appended claims. Thus, it is intended that the present invention covers the modifications and variations of this invention provided they come within the scope of the appended claims and their equivalents.

What is claimed is:

1. A dispersion and dispersion slope compensating optical fiber, comprising:
   a central core segment having a relative refractive index;
   a depressed moat segment on the periphery of the central core segment and having a relative refractive index that is less than the relative refractive index of the central core segment the relative refractive index of the depressed moat segment being less than –0.65%;
   an annular ring segment on the periphery of the depressed moat segment and having a relative refractive index that is less than the relative refractive index of the central core segment and greater that the relative refractive index of the depressed moat segment;
   and a cladding layer on the periphery of the annular ring segment and having a relative refractive index that is less that the relative refractive index of the annular ring segment and greater than the relative refractive index of the depressed moat segment;
   and wherein the relative refractive indices are selected to provide:
   negative dispersion at a wavelength of within the range of from about 1530 nm to about 1620 nm having a dispersion of about –240 ps/nm-km to about –140 ps/nm-km at a wavelength of about 1550 nm;
   negative dispersion slope at a wavelength of within the range of from about 1530 nm to about 1620 nm;
   a kappa value of within the range of about 40 to about 60 at a wavelength of about 1550 nm; and
   a fiber cut-off wavelength of less than about 1650 nm.

2. The optical fiber of claim 1, wherein the relative refractive indices are further selected to provide a dispersion slope of less than or equal to about –2.5 $ps/nm^2$-km at a wavelength of within the range of from about 1525 nm to about 1565 nm.

3. The optical fiber of claim 1, wherein the relative refractive indices are further selected to provide a fiber cut-off wavelength of less than or equal to about 1550 nm.

4. The optical fiber of claim 3, wherein the relative refractive indices are further selected to provide a fiber cut-off wavelength of within the range of from about 1470 nm to about 1530 nm.

5. The optical fiber of claim 1, wherein the relative refractive indices are further selected to provide a fiber cut-off wavelength of less than about 1500 nm.

6. The optical fiber of claim 5, wherein the relative refractive indices are further selected to provide a fiber cut-off wavelength of less than about 1450 nm.

7. The optical fiber of claim 1, wherein the relative refractive index of the central core segment is within the range of from about 1.40% to about 2.40%.

8. The optical fiber of claim 7, wherein the relative refractive index of the central core segment is within the range of from about 1.50% to about 1.80%.

9. The optical fiber of claim 7, wherein the relative refractive index of the depressed moat segment is within the range of from about –1.20% to about –0.70%.

10. The optical fiber of claim 9, wherein the relative refractive index of the depressed moat segment is within the range of from about –0.80% to about –0.70%.

11. The optical fiber of claim 1, wherein the relative refractive index of the annular ring segment is within the range of from about 0.10% to about 0.30%.

12. The optical fiber of claim 11, wherein the relative refractive index of the annular ring segment is within the range of from about 0.18% to about 0.20%.

13. The optical fiber of claim 12, wherein the relative refractive index of the annular ring segment is within the range of from about 0.19% to about 0.20%.

14. The optical fiber of claim 1, wherein the central core segment has an outer radius of within the range of about 2.2 µm to about 2.8 µm.

15. The optical fiber of claim 14, wherein the central core segment has an outer radius of within the range of about 2.5 µm to about 2.7 µm.

16. The optical fiber of claim 15, wherein the central core segment has an outer radius of within the range of about 2.61 µm to about 2.64 µm.

17. The optical fiber of claim 14, wherein the depressed moat segment has an outer radius of within the range of from about 3.5 µm to about 6.0 µm.

18. The optical fiber of claim 17, wherein the depressed moat segment has an outer radius of within the range of from about 4.8 µm to about 5.9 µm.

19. The optical fiber of claim 18, wherein the depressed moat segment has an outer radius of within the range of from about 5.5 µm to about 5.9 µm.

20. The optical fiber of claim 1, wherein the ratio of an outer radius of the central core segment to an outer radius of the depressed moat segment is within the range of from about 0.30 to about 0.56.

21. The optical fiber of claim 1, wherein the relative refractive indices are further selected to provide an effective area of greater than about 15 µm at a wavelength of about 1550 nm.

22. The optical fiber of claim 1, wherein the attenuation of the fiber is less than about 1.0 dB/km at a wavelength of about 1550 nm when wound about a 6 inch in diameter module.

23. The optical fiber of claim 1, wherein the relative refractive indices are further selected to provide a kappa value of less than or equal to about 60.

24. An optical fiber communication system, comprising:
a transmission fiber having a positive dispersion and positive dispersion slope over the wavelength range from 1525 nm to about 1595 nm,
the dispersion and slope compensating fiber of claim 1 optically coupled to the transmission fiber wherein a residual dispersion of the system is positive for some wavelengths and negative for other wavelengths within a wavelength range from 1530 nm to 1595 nm.

25. The optical fiber communication system of claim 24 wherein a residual dispersion for the optical fiber communication system is zero +/− an absolute value of less than 1.0 ps/nm/km over a wavelength range from 1530–1595 nm.

26. A packaged article comprising the dispersion and slope compensating fiber of claim 1 employed in coil form.

27. The optical fiber of claim 1, wherein the ratio of an outer radius of the central core segment to an outer radius of the depressed moat segment is within the range of from about 0.44 to about 0.55.

28. A dispersion and dispersion slope compensating optical fiber, comprising:
a central core segment having a relative refractive index wherein the central core segment has an outer radius of within the range of about 2.2 µm to about 2.8 µm;
a depressed moat segment on the periphery of the central core segment and having a relative refractive index that is less than the relative refractive index of the central core segment wherein the depressed moat segment has an outer radius of within the range of from about 3.5 µm to about 6.0 µm;
an annular ring segment on the periphery of the depressed moat segment and having a relative refractive index that is less than the relative refractive index of the central core segment and greater that the relative refractive index of the depressed moat segment wherein the annular ring segment has a central radius of within the range of from about 6.0 µm to about 8.5 µm and a width of about 4.0 µm;
and a cladding layer on the periphery of the annular ring segment and having a relative refractive index that is less that the relative refractive index of the annular ring segment and greater than the relative refractive index of the depressed moat segment;
and wherein the relative refractive indices are selected to provide:
negative dispersion at a wavelength of within the range of from about 1530 nm to about 1620 nm;
negative dispersion slope at a wavelength of within the range of from about 1530 nm to about 1620 nm;
a kappa value of within the range of about 40 to about 60 at a wavelength of about 1550 nm; and
a fiber cut-off wavelength of less than about 1650 nm.

29. The optical fiber of claim 28, wherein the annular ring segment has a central radius of within the range of from about 6.5 µm to about 7.7 µm and a width of about 4.0 µm.

30. The optical fiber of claim 29, wherein the annular ring segment has a central radius of within the range of from about 7.3 µm to about 7.4 µm and a width of about 4.0 µm.

31. A dispersion and dispersion slope compensating optical fiber, comprising:
a central core segment having a relative refractive index;
a depressed moat segment on the periphery of the central core segment and having a relative refractive index that is less than the relative refractive index of the central core segment;
an annular ring segment on the periphery of the depressed moat segment and having a relative refractive index that is less than the relative refractive index of the central core segment and greater that the relative refractive index of the depressed moat segment;
and a cladding layer on the periphery of the annular ring segment and having a relative refractive index that is less that the relative refractive index of the annular ring segment and greater than the relative refractive index of the depressed moat segment;
wherein the ratio of an outer radius of the central core segment to an outer radius of the depressed moat segment is within the range of from about 0.44 to about 0.55
and wherein the relative refractive indices are selected to provide:
negative dispersion at a wavelength of within the range of from about 1530 nm to about 1620 nm;
negative dispersion slope at a wavelength of within the range of from about 1530 nm to about 1620 nm;
a kappa value of within the range of about 40 to about 60 at a wavelength of about 1550 nm; and
a fiber cut-off wavelength of less than about 1650 nm.

32. The optical fiber of claim 31, wherein the ratio of an outer radius of the central core segment to an outer radius of the depressed moat segment is within the range of from about 0.44 to about 0.48.

33. A dispersion and dispersion slope compensating optical fiber, comprising:
a central core segment having a relative refractive index, wherein the central core segment has an outer radius within the range of from about 2.2 µm to about 2.8 µm and the relative refractive index of the central core segment is within the range of from about 1.4% to about 2.4%;
a depressed moat segment on the periphery of the central core segment and having a relative refractive index that is less than the relative refractive index of the central core segment nm, wherein the depressed moat segment has an outer radius within the range of about 3.5 µm to about 6.0 µm, and the relative refractive index of the depressed moat segment is less than or equal to about −0.65%;
an annular ring segment on the periphery of the depressed moat segment and having a relative refractive index that is less than the relative refractive index of the central core segment and greater that the relative refractive index of the depressed moat segment, and wherein the annular ring segment has a central radius within the range of from about 6.0 µm to about 8.5 µm and a width of about 4.0 µm, and a relative refractive index of the annular ring segment is within the range of from about 0.1% to about 0.3%;

and a cladding layer on the periphery of the annular ring segment and having a relative refractive index that is less that the relative refractive index of the annular ring segment and greater than the relative refractive index of the depressed moat segment;

and wherein the relative refractive indices are selected to provide:
- negative dispersion at a wavelength of within the range of from about 1530 nm to about 1620 nm;
- negative dispersion slope at a wavelength of within the range of from about 1530 nm to about 1620 nm;
- a kappa value of within the range of about 40 to about 60 at a wavelength of about 1550 nm; and
- a fiber cut-off wavelength of less than about 1650.

34. The optical fiber of claim 33, wherein the central core segment has an outer radius of within the range of from about 2.5 μm to about 2.7 μm, and the relative refractive index of the central core segment is within the range of from about 1.50% to about 1.8%, wherein the depressed moat segment has an outer radius within the range of from about 4.8 μm to about 5.9 μm and the relative refractive index of the depressed moat segment is within the range of from about −0.80% to about −1.00%, and wherein the annular ring segment has a central radius within the range of from about 6.5 μm to about 7.7 μm, a width of about 4.0 μm, and a relative refractive index within the range of from about 0.18% to about 0.20%.

35. An optical fiber communication system, comprising:
- an optical transmitter adapted to transmit an optical signal;
- a transmitting fiber in optical communication with the transmitter;
- a dispersion and dispersion slope compensating optical fiber in optical communication with the transmission fiber, the optical fiber comprising:
  - a central core segment having a relative refractive index;
  - a depressed moat segment on the periphery of the central core segment and having a relative refractive index that is less than the relative refractive index of the central core segment, the relative refractive index of the depressed moat segment being less than −0.65%;
  - an annular ring segment on the periphery of the depressed moat segment and having a relative refractive index that is less than the relative refractive index of the central core segment and greater that the relative refractive index of the depressed moat segment; and
  - a cladding layer on the periphery of the annular ring segment and having a relative refractive index that is less that the relative refractive index of the annular ring segment and greater than the relative refractive index of the depressed moat segment; and
- an optical receiver in optical communication with the compensating fiber; and
- wherein the relative refractive indices of the compensating fiber are selected to provide within the compensating fiber:
  - negative dispersion at a wavelength of within the range of from about 1530 nm to about 1620 nm having a dispersion of about −240 ps/nm-km to about −140 ps/nm-km at a wavelength of about 1550 nm;
  - negative dispersion slope at a wavelength of within the range of from about 1530 nm to about 1620 nm;
  - a kappa value of within the range of about 40 to about 60 at a wavelength of about 1550 nm; and
  - a fiber cut-off wavelength of less than about 1550 nm.

36. A dispersion and dispersion slope compensating optical fiber, comprising:
- a central core segment having a relative refractive index;
- a depressed moat segment on the periphery of the central core segment and having a relative refractive index that is less than the relative refractive index of the central core segment and further is less than −0.65%;
- an annular ring segment on the periphery of the depressed moat segment and having a relative refractive index that is less than the relative refractive index of the central core segment and greater that the relative refractive index of the depressed moat segment;
- and a cladding layer on the periphery of the annular ring segment and having a relative refractive index that is less that the relative refractive index of the annular ring segment and greater than the relative refractive index of the depressed moat segment;
- and wherein the relative refractive indices are selected to provide:
  - negative dispersion at a wavelength of within the range of from about 1530 nm to about 1620 nm and a dispersion of about −240 ps/nm-km to about −140 ps/nm-km at a wavelength of about 1550 nm;
  - negative dispersion slope at a wavelength of within the range of from about 1530 nm to about 1620 nm;
  - a kappa value of within the range of about 40 to about 60 at a wavelength of about 1550 nm;
  - a fiber cut-off wavelength of less than about 1650 nm; and
  - a core-moat ratio, defined as an outer radius of the central core segment divided by an outer radius of the depressed moat segment, of between 0.44 to 0.55.

* * * * *

UNITED STATES PATENT AND TRADEMARK OFFICE
CERTIFICATE OF CORRECTION

PATENT NO. : 6,650,814 B2
DATED : November 18, 2003
INVENTOR(S) : Caplen Julie E et al.

It is certified that error appears in the above-identified patent and that said Letters Patent is hereby corrected as shown below:

Column 11,
Line 7, "area of greater than about 15 $\mu$m at a wavelength of about" should be -- area of greater than about 15 $\mu m^2$ at a wavelength of about. --

Signed and Sealed this

Fourth Day of May, 2004

JON W. DUDAS
*Acting Director of the United States Patent and Trademark Office*